US012545436B2

United States Patent
Uetsuhara

(10) Patent No.: US 12,545,436 B2
(45) Date of Patent: Feb. 10, 2026

(54) SPACECRAFT CONTROL SYSTEM, SPACECRAFT CONTROL METHOD, AND SERVER DEVICE

(71) Applicant: Institute for Q-shu Pioneers of Space, Inc., Fukuoka (JP)

(72) Inventor: Masahiko Uetsuhara, Fukuoka (JP)

(73) Assignee: Institute for Q-shu Pioneers of Space, Inc. (JP)

(*) Notice: Subject to any disclaimer, the term of this patent is extended or adjusted under 35 U.S.C. 154(b) by 165 days.

(21) Appl. No.: 18/258,017

(22) PCT Filed: Dec. 22, 2020

(86) PCT No.: PCT/JP2020/048043
§ 371 (c)(1),
(2) Date: Jun. 16, 2023

(87) PCT Pub. No.: WO2022/137362
PCT Pub. Date: Jun. 30, 2022

(65) Prior Publication Data
US 2024/0051682 A1    Feb. 15, 2024

(51) Int. Cl.
*B64G 1/10* (2006.01)
*G01S 13/90* (2006.01)
*H04B 7/185* (2006.01)

(52) U.S. Cl.
CPC ....... *B64G 1/1021* (2013.01); *H04B 7/18513* (2013.01); *G01S 13/9004* (2019.05)

(58) Field of Classification Search
CPC .... B64G 1/1021; B64G 1/443; B64G 1/1085; B64G 1/66; B64G 3/00; H04B 7/18513;
(Continued)

(56) References Cited

U.S. PATENT DOCUMENTS 11,223,139 B2    1/2022    Onishi et al.
2019/0141045 A1   5/2019    Stocker
(Continued)

FOREIGN PATENT DOCUMENTS

| CN | 109039419 A | 12/2018 |
| WO | 2017221872 A1 | 12/2017 |
| WO | 2022137362 A1 | 6/2022 |

OTHER PUBLICATIONS

International Search Report issued by the Japan Patent Office for PCT/JP2020/048043, mailing date Mar. 23, 2021, 2 pages.
(Continued)

*Primary Examiner* — Christopher K Peterson
(74) *Attorney, Agent, or Firm* — Jaffery Watson Hamilton & DeSanctis LLP

(57) ABSTRACT

Provided are a spacecraft control system, a spacecraft control method, and a server device capable of quickly transmitting control data to a spacecraft. The spacecraft system includes: a plurality of spacecrafts; a plurality of small communicators that transmit control data related to imaging operations of the spacecrafts to the spacecrafts; and at least one ground station that receives, from the spacecrafts, captured image data related to images captured by the spacecrafts and space position data for the spacecrafts, and transmits identification data for the small communicators to the spacecrafts, in which each of the spacecrafts includes at least a first reception device that receives the control data transmitted from the small communicators, a control device that controls an imaging operation of the spacecraft on the basis of the control data received by the first reception device, and an imaging device that executes the imaging operation.

14 Claims, 8 Drawing Sheets

(58) Field of Classification Search
CPC . H04B 7/18528; H04B 7/195; G01S 13/9004; H04L 9/3226; Y02D 30/70
See application file for complete search history.

(56) References Cited

U.S. PATENT DOCUMENTS

2020/0007224 A1   1/2020  Hawthorne
2021/0036767 A1*  2/2021  Devaraj ............. H04B 7/18513
2021/0184764 A1*  6/2021  Metzger ............. H04B 7/18521

OTHER PUBLICATIONS

Qu, Zhicheng et al., "LEO Satellite Constellation for Internet of Things", IEEE Access, vol. 5, published Aug. 4, 2017, 11 pages.
International Preliminary Report on Patentability and Written Opinion of the International Searching Authority for PCT/ JP2020/ 048043, mailing date Mar. 23, 2021, 4 pages.
Extended European Search Report for EP20966853, mailing date Aug. 7, 2024, 7 pages, EPO.
Alvarez, Jennifer et al., "Constellations, clusters, and communication technology: Expanding small satellite access to space", 2016 IEEE Aerospace Conference, IEEE, Mar. 5, 2016, pp. 1-11.
Extended European Search Report for EP20966853.2, mailing date Aug. 7, 2024, 7 pages, EPO.

* cited by examiner (min)

SPACECRAFT CONTROL SYSTEM, SPACECRAFT CONTROL METHOD, AND SERVER DEVICE

CROSS-REFERENCE TO RELATED APPLICATIONS

This application is a national phase application of International Application No. PCT/JP2020/048043, filed on Dec. 22, 2020, which is hereby incorporated by reference in its entirety for all purposes.

TECHNICAL FIELD

The present disclosure relates to a spacecraft control system, a spacecraft control method, and a server device.

BACKGROUND

Conventionally, a spacecraft such as an artificial satellite on which various radars (antennas) including a synthetic aperture radar are mounted has been known (Patent Literature 1 and Non Patent Literature 1). In particular, the synthetic aperture radar acquires a synthetic aperture radar (SAR) image by transmitting a radio wave from outer space to the earth and receiving a reflected wave of the radio wave from the earth's surface or the like, and has attracted attention in that an image can be acquired even in an obstacle such as a cloud or a dark place.

CITATION LIST

Patent Literature

Patent Literature 1: WO 2017/221872 A

Non Patent Literature

Non Patent Literature 1: Zhicheng Qu, et al., "LEO Satellite Constellation for Internet of Things", [online], Aug. 4, 2017, IEEE, [searched on Oct. 9, 2020], Internet (https://ieeexplore.ieee.org/stamp/stamp.jsp?arnumber=8002583)

SUMMARY OF INVENTION

Technical Problem

Meanwhile, in order for a spacecraft such as an artificial satellite on which a radar is mounted to acquire an image of the earth or the like, at least one ground station that transmits data for controlling an imaging operation related to acquisition of an image or the like to the spacecraft is required. However, there is a limit to a place where the ground station can be installed. In addition, in quickly transmitting the above-described control data to the spacecraft, there is a limit in a system, a method, or the like in which ground stations are main components because the locations at which ground stations and the number of ground stations are limited.

Therefore, various embodiments provide a spacecraft control system, a spacecraft control method, and a server device capable of quickly transmitting control data to a spacecraft.

Solution to Problem

A spacecraft control system according to one aspect includes:
- a plurality of spacecrafts that image the earth;
- a plurality of small communicators that transmit control data related to imaging operations of the spacecrafts to the spacecrafts; and
- at least one ground station that receives, from the spacecrafts, captured image data related to images captured by the spacecrafts and space position data for the spacecrafts, and transmits identification data for the small communicators to the spacecrafts,
- in which each spacecraft of the spacecrafts includes at least a first reception device that receives the control data transmitted from the small communicators, a control device that controls an imaging operation of the spacecraft on the basis of the control data received by the first reception device, and an imaging device that executes the imaging operation.

In the spacecraft control system according to one aspect, a plurality of operation patterns assumed in relation to the imaging operation of the spacecraft may be stored in advance in the control device, and the control data may include selection data for selecting one of the plurality of operation patterns, image-captured position data related to a position at which an image is captured by the spacecraft, and imaging time data.

In the spacecraft control system according to one aspect, the spacecraft may further include a second transmission/reception device that transmits and receives the captured image data, the space position data, and the identification data to and from the ground station.

In the spacecraft control system according to one aspect, the identification data may include at least one of position data for the small communicators and ID data for the small communicators.

The spacecraft control system according to one aspect may further include a server device that is connected to the ground station via a communication line to receive the captured image data and the space position data from the ground station, and receives the identification data from the small communicators via a communication line to control transmission of the control data to the spacecrafts from the small communicators.

In the spacecraft control system according to one aspect, the server device may: receive image capturing request data including the image-captured position data via a communication line; and determine, among the plurality of spacecrafts and the plurality of small communicators, a combination of at least one spacecraft that executes an imaging operation and at least one small communicator that transmits the control data to the at least one spacecraft that executes the imaging operation, with reference to at least the image-captured position data, the space position data, and the identification data.

In the spacecraft control system according to one aspect, the combination may be determined on the basis of a total time of: a first time required from a predetermined reference time until the transmission of the control data from the small communicator to the spacecraft is completed; a second time required from completion of reception of the control data until the spacecraft completes the imaging operation; and a third time required from completion of the imaging operation until transmission of the captured image data from the spacecraft to the ground station is completed.

In the spacecraft control system according to one aspect, the server device may: receive, from sensors connected to the small communicators, environment data including the image-captured position data corresponding to positions of the small communicators and the sensors via a communication line; determine whether to capture an image at each of the positions corresponding to the image-captured position data on the basis of the environment data; and when it is determined to capture an image at each of the positions corresponding to the image-captured position data, determine, among the plurality of spacecrafts and the plurality of small communicators, a combination of at least one spacecraft that executes an imaging operation and at least one small communicator that transmits the control data to the at least one spacecraft that executes the imaging operation, with reference to at least the image-captured position data, the space position data, and the identification data.

In the spacecraft control system according to one aspect, the small communicators may: receive, from sensors connected to the small communicators, environment data including the image-captured position data corresponding to positions of the small communicators and the sensors; and transmit the control data to at least one spacecraft when the environment data satisfies a predetermined condition.

In the spacecraft control system according to one aspect, the transmission of the control data from the small communicators to the spacecrafts may be executed by low power wide area (LPWA)-type wireless communication.

A spacecraft control method executed by at least one processor that executes computer-readable instructions according to one aspect includes, by the processor executing the instructions:
receiving image capturing request data including image-captured position data related to a position at which an image is captured by any one of a plurality of spacecrafts via a communication line;
receiving, from each of the plurality of spacecrafts, space position data via at least one ground station;
receiving in advance identification data from each of a plurality of small communicators that transmit control data related to imaging operations to the plurality of spacecrafts via a communication line;
determining a combination of at least one spacecraft that performs an imaging operation to image the earth and at least one small communicator that transmits the control data to the at least one spacecraft that performs the imaging operation with reference to at least the received image-captured position data, the space position data for each of the plurality of spacecrafts, and the identification data for each of the plurality of small communicators; and
transmitting a request signal for requesting the determined at least one small communicator to transmit the control data to the determined at least one spacecraft.

In the spacecraft control method according to one aspect, the processor may include a central processing unit (CPU), a microprocessor, and/or a graphics processing unit (GPU).

A spacecraft control method executed by at least one processor that executes computer-readable instructions according to one aspect includes, by the processor executing the instructions:
receiving environment data including image-captured position data related to a position at which an image is captured by any one of a plurality of spacecrafts from a sensor via a communication line;
receiving, from each of the plurality of spacecrafts, space position data via at least one ground station;
receiving in advance identification data from each of a plurality of small communicators that transmit control data related to imaging operations to the plurality of spacecrafts via a communication line;
determining whether to capture an image at the position corresponding to the image-captured position data on the basis of the received environment data;
determining a combination of at least one spacecraft that performs an imaging operation to image the earth and at least one small communicator that transmits the control data to the at least one spacecraft that performs the imaging operation with reference to at least the received image-captured position data, the space position data for each of the plurality of spacecrafts, and the identification data for each of the plurality of small communicators; and
transmitting a request signal for requesting the determined at least one small communicator to transmit the control data to the determined at least one spacecraft.

In the spacecraft control method according to one aspect, the processor may include a central processing unit (CPU), a microprocessor, and/or a graphics processing unit (GPU).

A server device including at least one processor according to one aspect causes the at least one processor to function to:
receive image capturing request data including image-captured position data related to a position at which an image is captured by any one of a plurality of spacecrafts via a communication line;
receive space position data from each of the plurality of spacecrafts via at least one ground station;
receive in advance identification data from each of a plurality of small communicators that transmit control data related to imaging operations to the plurality of spacecrafts via a communication line;
determine a combination of one spacecraft that performs an imaging operation to image the earth and one small communicator that transmits the control data to the one spacecraft that performs the imaging operation with reference to at least the received image-captured position data, the space position data for each of the plurality of spacecrafts, and the identification data for each of the plurality of small communicators; and
transmit a request signal for requesting the determined at least one small communicator to transmit the control data to the determined at least one spacecraft.

In the server device according to one aspect, the processor may include a central processing unit (CPU), a microprocessor, and/or a graphics processing unit (GPU).

A server device including at least one processor according to one aspect causes the at least one processor to function to:
receive environment data including image-captured position data related to a position at which an image is captured by any one of a plurality of spacecrafts from a sensor via a communication line;
receive space position data from each of the plurality of spacecrafts via a ground station;
receive in advance identification data from each of a plurality of small communicators that transmit control data related to imaging operations to the plurality of spacecrafts via a communication line;
determine whether to capture an image at the position corresponding to the image-captured position data on the basis of the received environment data;
determine a combination of at least one spacecraft that performs an imaging operation to image the earth and at least one small communicator that transmits the control data to the at least one spacecraft that performs the imaging operation with reference to at least the received image-captured position data, the space position data for each of the plurality of spacecrafts, and the identification data for each of the plurality of small communicators; and transmit a request signal for requesting the determined at least one small communicator to transmit the control data to the determined at least one spacecraft.

In the server device according to one aspect, the processor may include a central processing unit (CPU), a microprocessor, and/or a graphics processing unit (GPU).

Advantageous Effects of Invention

According to various embodiments, it is possible to provide a spacecraft control system, a spacecraft control method, and a server device capable of quickly transmitting control data to a spacecraft.

DESCRIPTION OF EMBODIMENTS

Hereinafter, various embodiments of the present disclosure will be described with reference to the accompanying drawings. Additionally, components common between the drawings are denoted by the same reference signs. In addition, it should be noted that a component illustrated in a certain drawing may be omitted in another drawing for convenience of description. Furthermore, it should be noted that the accompanying drawings are not necessarily drawn to scale. Furthermore, the term "application" may be referred to as software or program, which may be a combination of commands to a computer for obtaining a certain result.

Also, as used herein, singular forms accompanied by "a", "the", "said", "aforementioned", "its", "this", "that", and the like may include plural forms unless it is explicitly stated that singular forms do not include plural forms. In addition, the term "comprise" may mean "include" or "has".

Figure 1:
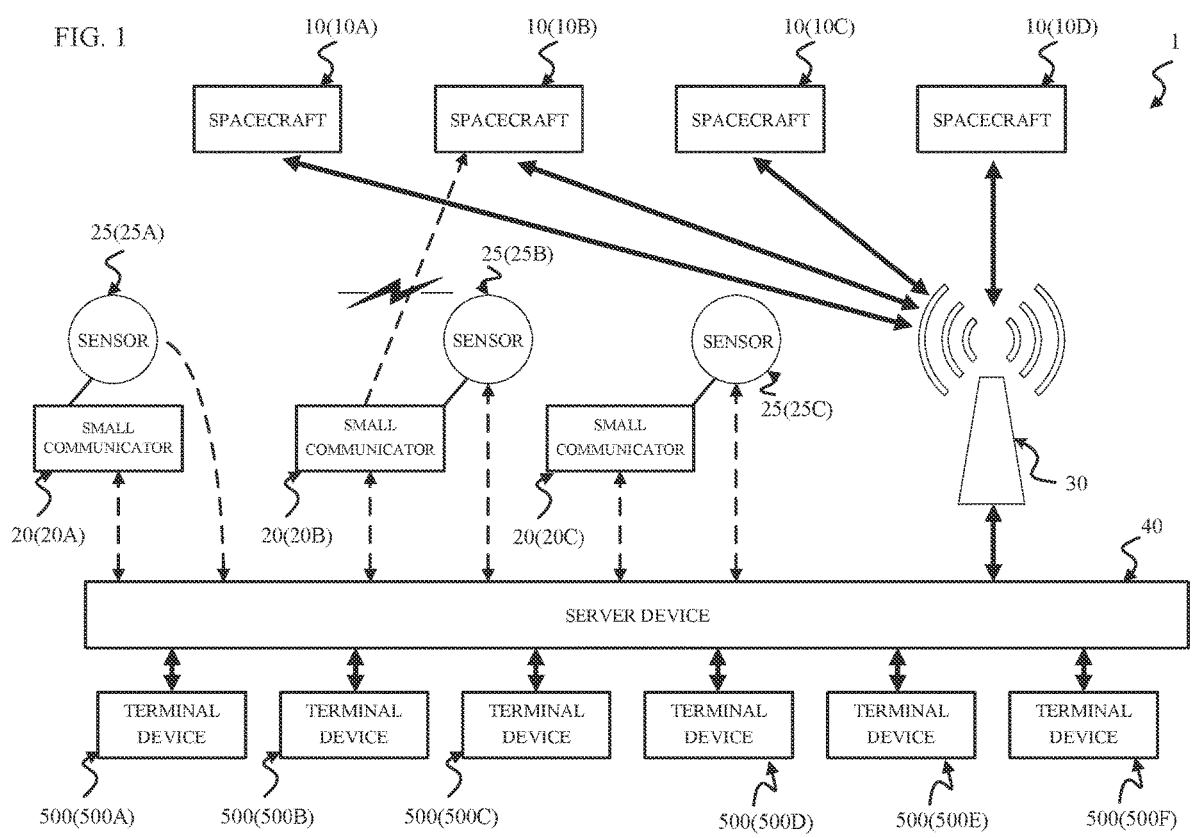
FIG. 1 is a block diagram illustrating an example of a configuration of a spacecraft control system according to an embodiment.
Figure 2:
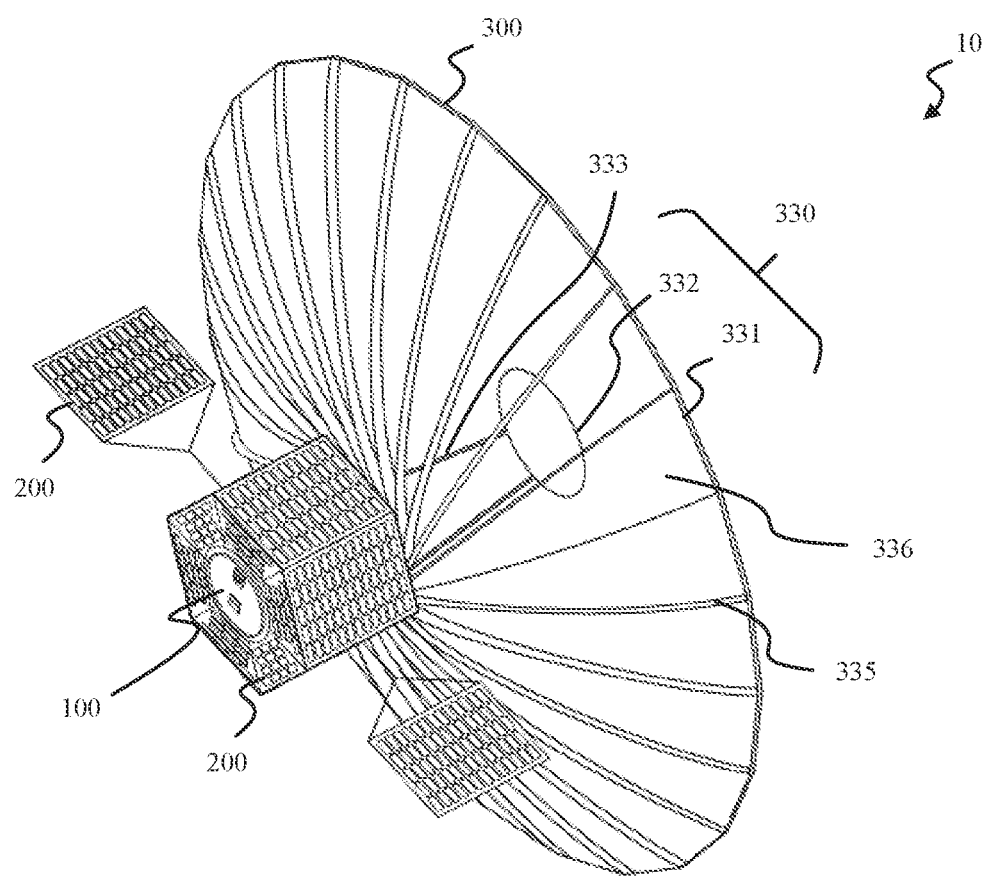
FIG. 2 is a diagram illustrating a structure of a spacecraft illustrated in FIG. 1.
Figure 3:
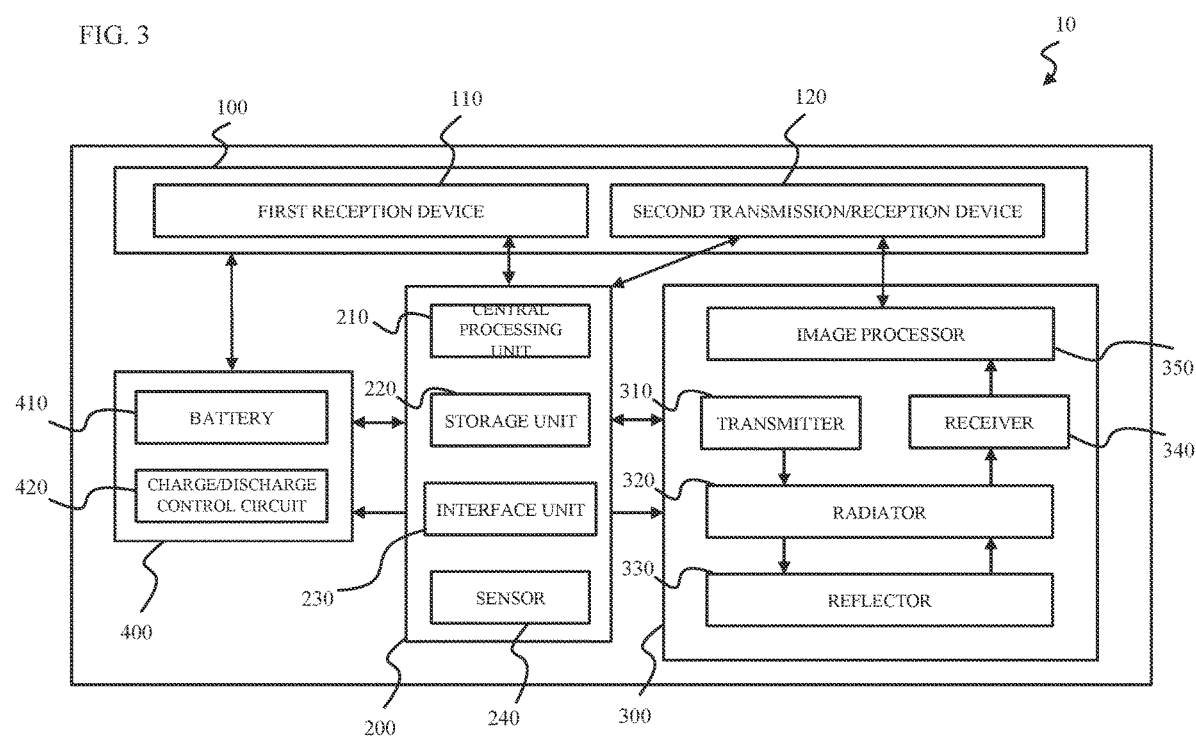
FIG. 3 is a block diagram schematically illustrating an example of a configuration of the spacecraft illustrated in FIG. 1.
Figure 4:
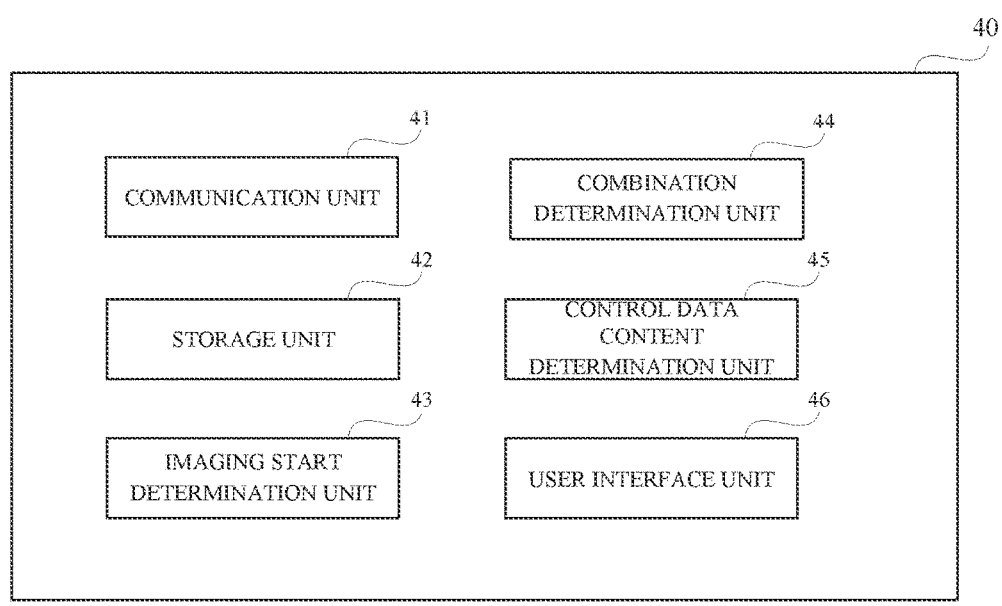
FIG. 4 is a block diagram schematically illustrating an example of functions of a server device illustrated in FIG. 1.
Figure 5:
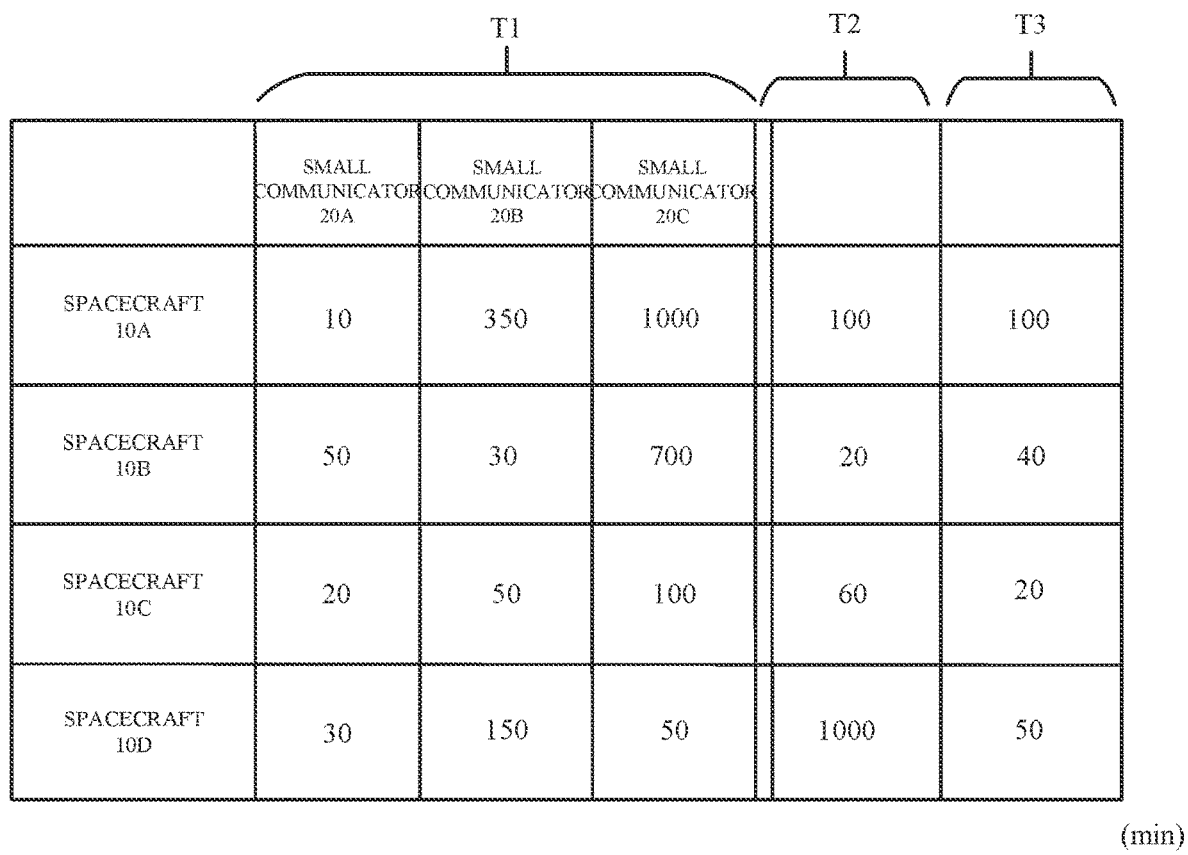
FIG. 5 is a diagram illustrating an example of a table referred to by a combination determination unit of the server device illustrated in FIG. 1.

1. Configuration of Spacecraft Control System According to Embodiment and Each Component Constituting System An overview of an overall configuration of a spacecraft control system 1 according to an embodiment will be described with reference to FIGS. 1 to 5. FIG. 1 is a block diagram illustrating an example of a configuration of a spacecraft control system 1 according to an embodiment. FIG. 2 is a diagram illustrating a structure of a spacecraft 10 illustrated in FIG. 1. FIG. 3 is a block diagram schematically illustrating an example of a configuration of the spacecraft 10 illustrated in FIG. 1. FIG. 4 is a block diagram schematically illustrating an example of functions of a server device 40 illustrated in FIG. 1. FIG. 5 is a diagram illustrating an example of a table referred to by a combination determination unit 44 of the server device 40 illustrated in FIG. 1.

As illustrated in FIG. 1, the spacecraft control system 1 mainly includes a plurality of spacecrafts 10, a plurality of small communicators 20, a ground station 30, and a server device 40. Hereinafter, each component constituting the spacecraft control system 1 will be described in detail.

1-1. Spacecraft 10

The spacecraft 10 will be described in detail with reference to FIGS. 1 to 3. The spacecraft 10 can use, for example, an artificial satellite, but is not limited thereto, and can be any type of mobile object capable of navigating outer space. Additionally, in the spacecraft control system 1 according to the present disclosure, a plurality of spacecrafts 10 can be used. In FIG. 1, four spacecrafts 10A to 10D are illustrated as an example.

As illustrated in FIGS. 2 and 3, the spacecraft 10 (each of the spacecraft 10A to 10D) can mainly include a communication device 100 that transmits and receives various data to and from the small communicator 20 and the ground station 30, a control device 200 that controls an imaging operation of an imaging device 300, a posture of the spacecraft 10, etc., an imaging device 300 that images the earth, and a power supply unit 400 that supplies power to the communication device 100, the control device 200, and the imaging device 300. The communication device 100, the control device 200, the imaging device 300, and the power supply unit 400 are electrically connected to each other via control lines and data lines.

1-1-1. Communication Device 100

As illustrated in FIG. 3, the communication device 100 can include a first reception device 110 and a second transmission/reception device 120. The first reception device 110 can receive control data related to the imaging operation of the imaging device 300 transmitted from the small communicator 20, and transmit the control data to the imaging device 300. The second transmission/reception device 120 can transmit and receive various data to and from the ground station 30.

For example, the second transmission/reception device 120 can transmit, to the ground station 30, captured image data acquired by the control device 200 and space position data related to a position of the spacecraft 10 in outer space monitored by the control device 200. Additionally, the space position data for the spacecraft 10 can be acquired as needed by sensors 240 to be described below.

In addition, the second transmission/reception device 120 can receive identification data for each of the plurality of small communicators 20 from the ground station 30, and store the identification data in a storage unit 220 to be described below. As a result, when the second transmission/reception device 120 receives control data from a certain small communicator 20, it is possible to grasp which small communicator 20 the control data has been received from, among the plurality of small communicators 20, on the basis of the identification data for the certain small communicator 29 included in the control data. In addition, the identification data for each of the small communicators 20 transmitted from the ground station 30 to the second transmission/reception device 120 includes position data for each of the small communicators 20. As a result, the second transmission/reception device 120 can store the position data and the ID data for each of the plurality of small communicators 20 in association with each other in the storage unit 220. Therefore, in a case where control data is transmitted from a certain small communicator 20 to the spacecraft 10, it is not necessarily required that position data for the certain small communicator 20 be included in the control data, thereby making it possible to reduce the capacity of the control data (in this case, if the control data includes ID data for the certain small communicator 20, the position data for the certain small communicator 20 associated with the ID data can be grasped by referring to the storage unit 220 in the spacecraft 10).

As illustrated in FIG. 3, the first reception device 110 and the second transmission/reception device 120 may be provided separately or integrally in the communication device 100.

The transmission of the control data from the small communicator 20 to the first reception device 110 is preferably executed by low power wide area (LPWA)-type wireless communication, and for example, LoRa-type wireless communication can be used. Therefore, dedicated communication modules (including dedicated communication antennas) for executing the LoRa-type wireless communication are mounted on the first reception device 110 and the small communicator 20. Additionally, since the LPWA-type wireless communication and the LoRa-type wireless communication are already known, the detailed description thereof will be omitted.

By executing the transmission of the control data from the small communicator 20 to the first reception device 110 by the LPWA-type wireless communication (LoRa-type wireless communication) capable of performing long-distance communication between the ground and outer space, the first reception device 110 (and the small communicator 20) can be small-sized.

On the other hand, it has been known that the LoRa-type wireless communication has a restriction on capacity for data transmission. Therefore, it is preferable to design in advance the capacity of control data to be transmitted from the small communicator 20 to the first reception device 110 to be, for example, 100 bps or less. In order to set the capacity of the control data to 100 bps or less, it is preferable, for example, that the content of the control data mainly includes selection data for selecting one of operation patterns related to the imaging operation that can be executed by the imaging device 300, image-captured position data related to a position on the earth at which an image is captured by the imaging device 300, and imaging time data related to a time at which an image is captured by the imaging device 300.

Here, the selection data is data in which, for example, a plurality of operation patterns assumed in relation to the imaging operation of the spacecraft 10 (the imaging device 300) in the control device 200 (the storage unit 220 of the control device 200) are stored in advance together with encrypted data, such that only the encrypted data can be transmitted from the small communicator 20 to the first reception device 110. In this case, when the first reception device 110 transmits the encrypted data received from the small communicator 20 to the control device 200, the control device 200 can read an operation pattern corresponding to the encrypted data from the storage unit 220 and control an imaging operation of the imaging device 300 according to the read operation pattern.

The plurality of operation patterns described above means a plurality of imaging modes, and can include, for example, two modes, i.e., a wide-area imaging mode and a high-resolution imaging mode. In this case, the wide-area imaging mode and the high-resolution imaging mode can be encrypted to "MODE1" and "MODE2", respectively (each of "MODE1" and "MODE2" is encrypted data). Additionally, the plurality of operation patterns are not limited to the two mode, i.e., the wide-area imaging mode and the high-resolution imaging mode, and may include other modes.

The above-described captured image data indicates a certain point or region on the earth required to be imaged, and can include latitude information and longitude information. Furthermore, the above-described imaging time data can include, but is not limited to, a time at which it is required to capture an image (a time at which the spacecraft 10 needs to capture an image, perform an observation, or the like), a time at which an image is captured, and the like.

In summary, for example, control data "2022-10-14/13:00/33.55 degrees north latitude/135.55 degrees east longitude/MODE1/(FROM 20B TO 10A)" is transmitted from the small communicator 20 to the first reception device 110. In this case, "2022-10-14/13:00" corresponds to the imaging time data, "33.55 degrees north latitude/135.55 degrees east longitude" corresponds to the image-captured position data, and "MODE1" corresponds to the selection data. Additionally, the control data may include identification data (e.g., "20B") for a small communicator 20 that is a transmission source.

The transmission and reception of various data between the second transmission/reception device 120 and the ground station 30 may be performed by the LPWA-type wireless communication described above, but is not limited thereto, and various general types and band communication types can be used.

1-1-2. Control Device 200

The control device 200 can receive, from the first reception device 110, the control data received by the first reception device 110 from the small communicator 20, and control an imaging operation of the imaging device 300 on the basis of the control data. Furthermore, a posture and the like of the spacecraft 10 can be controlled in association with the imaging operation.

The control device 200 mainly includes, as hardware, a central processing unit 210, a storage unit 220, an interface unit 230, a sensor 240, and the like connected to each other by a data bus and/or a control bus, and can execute various kinds of information processing to be described below.

The central processing unit 210, which is a known processor, is referred to as, for example, "CPU", and can generate a control signal related to the imaging operation of the imaging device 300 and a control signal related to a posture of the spacecraft 10 related to the imaging operation by performing various calculations on the basis of instructions and data stored in the storage unit 220.

The storage unit 220 is referred to as "memory", and can store instructions and data received via the interface unit 230 and the like, calculation results of the central processing unit 210, and the like. Furthermore, the storage unit 220 can store instructions and data (computer programs) constituting specific applications, specifically, an application for controlling an imaging operation of the imaging device 300, an application for controlling a posture of the spacecraft 10, and the like. The storage unit 220 can include, but is not limited to, a computer-readable medium such as a random access memory (RAM), a read-only memory (ROM), a flash memory, and a hard disk drive (HDD).

Furthermore, as described above, the storage unit 220 can store a plurality of operation patterns assumed in relation to the imaging operation of the imaging device 300 together with encrypted data in advance. Specifically, the wide-area imaging mode can be stored together with encrypted data "MODE1", and the high-resolution imaging mode can be stored together with encrypted data "MODE2". Furthermore, the storage unit 220 can store various data related to information for controlling a posture of the spacecraft 10 corresponding to each of the wide-area imaging mode and the high-resolution imaging mode (for example, in the wide-area imaging mode, the posture of the spacecraft 10 is controlled to maintain the same posture with respect to the ground surface at the image-captured position, and on the other hand, in the high-resolution imaging mode, the posture of the spacecraft 10 is controlled to track the ground surface at the image-captured position), a frequency of a radio wave radiated from the imaging device 300, information regarding a time period during which a radio wave is radiate from the imaging device 300 (for example, several seconds to several minutes in the wide-area imaging mode, and several seconds in the high-resolution imaging mode.), information regarding conditions for modulation/demodulation and the like, information regarding a time required for the imaging operation, and the like, and methods for calculating them and the like (computer programs and the like). As a result, the central processing unit 210 can generate various control signals related to the imaging operation of the imaging device 300.

Furthermore, as described above, the storage unit 220 can store identification data for each of the plurality of small communicators 20. Specifically, the storage unit 220 can store the ID data for each of the plurality of small communicators 20 in association with data on a position of each of the plurality of small communicators 20.

As an example, the sensor 240 may include a gyro sensor, an acceleration sensor, a position sensor, a speed sensor, and the like used for acquiring various data related to a progress, a position in outer space, a posture, and the like of the spacecraft 10, and controlling them. As an example, the sensor may further include a temperature sensor, an illuminance sensor, an infrared sensor, and the like for observing the external environment and/or the internal environment of the spacecraft 10. After being appropriately stored in the storage unit 220, the various sensor data acquired by the sensor may be used for arithmetic processing by the central processing unit 210, or may be appropriately transmitted to the ground station 30 via the second transmission/reception device 120.

1-1-3. Imaging Device 300

The imaging device 300 receives the above-described control signal generated by the control device 200 to execute an imaging operation. As the imaging device 300, for example, a synthetic aperture radar can be used. As illustrated in FIGS. 2 and 3, the imaging device 300 can mainly include a transmitter 310, a radiator 320, a reflector 330, a receiver 340, and an image processor 350.

The transmitter 310 transmits a pulse signal of a predetermined frequency on the basis of the control signal from the control device 200. The pulse signal is subjected to processing such as modulation and/or demodulation if necessary, converted into a high-frequency radio frequency, amplified, radiated from the radiator 320 to the reflector 330, and then radiated to a space outside the imaging device 300.

Thereafter, a radio wave (a reflected wave) reflected at an image-captured point is received by the receiver 340 via the reflector 330 and the radiator 320. The image processor 350 can generate image data at an image-captured point on the basis of the reflected wave. The image data generated by the image processor 350 is transmitted to the ground station 30 via the second transmission/reception device 120 described above. Additionally, the reflected wave received by the receiver 340 may also be transmitted to the ground station 30 via the second transmission/reception device 120.

Here, as illustrated in FIG. 2, the radiator 320 and the reflector 330 correspond to antennas. The reflector 330 can include a sub reflector (a sub reflecting mirror) 332 disposed to face the radiator 320 at a predetermined angle for reflecting the radio wave radiated from the radiator 320 to a reflector 331 that is a main reflecting mirror, a reflector 331 disposed to face a mirror surface of the sub reflector 332 for further reflecting the radio wave reflected by the sub reflector 332 and then radiating the radio wave to a space outside the imaging device 300, and a support member 333 for supporting the sub reflector 332.

The reflector 331 includes a plurality of ribs 335, a planar body 336, etc., and has a reflection surface formed in a parabolic shape to function as a main reflecting mirror. The details of the antenna including the ribs 335, the planar body 336, and other components have already been known, and thus, the detailed description thereof will be omitted.

1-1-4. Power Supply Unit 400

As illustrated in FIG. 3, the power supply unit 400 can include a battery 410 and a charge/discharge control circuit 420. As the battery 410, a solar cell using a solar panel can be used as an example. The battery 410 is connected to the communication device 100, the control device 200, and the imaging device 300, and can supply power to each of them. The charge/discharge control circuit 420 can control power supply from the battery 410 to each device and charge/discharge of the battery 410. Additionally, various data related to battery performance such as a voltage, a current, a temperature, and the like of the battery 410 can be appropriately transmitted to the server device 40 via the second transmission/reception device 120 and the ground station 30.

1-2. Small Communicator 20

In the spacecraft control system 1 according to the present disclosure, a plurality of small communicators 20 can be used. In FIG. 1, three small communicators 20 (20A to 20C) are illustrated as an example.

A dedicated communication module (including a dedicated communication antenna) for performing LoRa-type wireless communication with the spacecraft 10 is mounted on the small communicator 20. Furthermore, the small communicator 20 can include a battery and a transmission/reception device for transmitting and receiving various data to and from the server device 40 to be described below. The small communicator 20 and the server device 40 are connected to each other via a communication line. As a result, the identification data for each small communicator 20 can be transmitted from the small communicator 20 to the server device 40. Here, the identification data may include position data, serial number data (ID data), and the like for each small communicator 20.

Furthermore, by connecting each of the plurality of small communicators 20 and the server device 40 to each other via the communication line, each of the small communicators 20 can transmit the above-described control data to a predetermined spacecraft 10 on the basis of an instruction signal (a command signal) received from the server device 40.

Incidentally, the communication line that connects the small communicator 20 and the server device 40 to each other can include, but is not limited to, a mobile phone network, a wireless network (WiFi, WiMax, cellular, etc.), a fixed phone network, the Internet, a local area network (LAN), a wide area network (WAN), an intranet, and/or Ethernet (registered trademark).

Furthermore, as illustrated in FIG. 1, various sensors 25 (25A to 25C) may be connected to the small communicators 20, respectively. Examples of the sensor 25 applicable include, but are not limited to, a vibration sensor that detects vibrations, various sensors that detect abnormalities such as earthquake, landslide, strong wind, rainfall, snowfall, snow cover, or flood, various sensors that detect intrusions of suspicious persons, animals, and the like, various sensors that detect abnormalities of large facilities, roads, other infrastructures, and the like and output some data (environment data). By detecting something, the sensor 25 can transmit various environment data related to the detection to the server device 40 via the communication line. Here, the environment data may include position data (image-captured position data) related to a point (or a region) where the sensor 25 (and the small communicator 20 to which the sensor 25 is connected) is installed. The various environment data output by the sensor 25 may be transmitted from the small communicator 20 to the server device 40, after being transmitted from the sensor 25 to the small communicator 20 to which the sensor 25 is connected. Examples of the environment data can include data such as a frequency and a seismic intensity corresponding to vibration, earthquake, or the like, wind speed data corresponding to strong wind, precipitation amount data corresponding to rainfall, snowfall amount data corresponding to snowfall and snow cover, some other temperature data, weight data, volume data, and the like.

1-3. Ground Station 30

As the ground station 30, a generally known ground station can be used, and the ground station 30 can include a battery, a first communication unit for transmitting and receiving various data to and from each of the plurality of spacecrafts 10, and a second communication unit for transmitting and receiving various data to and from the server device 40. Additionally, the ground station 30 and the server device 40 are connected to each other via a communication line.

As a result, the ground station 30 can receive, from each of the spacecrafts 10, captured (acquired) image data (captured image data) and space position data related to a position of the spacecraft 10 in outer space monitored by the control device 200, and can transfer (transmit) the received image data and space position data to the server device 40. On the other hand, the ground station 30 can receive identification data for each of the plurality of small communicators 20 from the server device 40, and transfer (transmit) the received identification data to each of the plurality of spacecrafts 10.

Additionally, the communication line that connects the ground station 30 and the server device 40 to each other can include, but is not limited to, a mobile phone network, a wireless network (WiFi, WiMax, cellular, etc.), a fixed phone network, the Internet, a local area network (LAN), a wide area network (WAN), an intranet, and/or Ethernet (registered trademark). Furthermore, in the spacecraft control system 1 according to the present disclosure, the number of ground stations 30 is not necessarily limited to one, and a plurality of ground stations 30 may be used.

1-4. Server Device 40

Next, the server device 40 will be described in detail with reference to FIGS. 1 and 4. Although only one server device 40 is illustrated in FIG. 1 as an example, a plurality of server devices 40 may be used for the purpose of, for example, distributing loads. The server device 40 can execute various kinds of processing to be described below by installing specific applications for executing the spacecraft control system 1 according to the present disclosure therein.

First, as illustrated in FIG. 1, the server device 40 is connected to the plurality of small communicators 20 (the small communicators 20A to 20C in FIG. 1) via communication lines. As a result, the server device 40 can transmit, to each of the plurality of small communicators 20, an instruction signal (a command signal) for transmitting the above-described control data to a predetermined spacecraft 10 (in other words, the server device 40 can control transmission of control data to the spacecraft 10 through the small communicator 20). Furthermore, the server device 40 can receive the above-described identification data from each of the plurality of small communicators 20.

Second, as illustrated in FIG. 1, the server device 40 is also connected to the ground station 30 via a communication line. As a result, the server device 40 can receive space position data related to a position of each of the plurality of spacecrafts 10 in outer space from the ground station 30. Furthermore, the server device 40 can receive image data (captured image data) captured (acquired) by the spacecraft 10 from the ground station 30. On the other hand, the server device 40 can transmit the identification data for each of the plurality of small communicators 20 to the ground station 30.

Furthermore, the server device 40 is also connected to a plurality of terminal devices 500 (terminal devices 500A to 500F in FIG. 1) of users who use the spacecraft control system 1 according to the present disclosure via communication lines. In this case, the communication line may also include, but is not limited to, a mobile phone network, a wireless network (WiFi, WiMax, cellular, etc.), a fixed phone network, the Internet, a local area network (LAN), a wide area network (WAN), an intranet, and/or Ethernet (registered trademark).

As a result, the server device 40 can receive image capturing request data for requesting image capturing at a certain point (or in a certain region) from a terminal device 500 (any of the terminal devices 500A to 500F in FIG. 1) of a user. On the other hand, the server device 40 can also transmit the image data received via the ground station 30 to, for example, the terminal device 500 of the user who has transmitted the image capturing request data. Additionally, the image capturing request data transmitted from the terminal device 500 to the server device 40 includes image-captured position data for specifying the "certain point". Examples of the image-captured position data can include, but are not limited to, address data, latitude data, longitude data, and the like at the "certain point".

The hardware configuration of the server device 40 mainly includes a central processing unit, a storage unit, and an interface unit, which are similar to the central processing unit 210, the storage unit 220, and the interface unit 230 in the control device 200 described above.

The central processing unit, which is a known processor, is referred to as, for example, "CPU", and can perform various operations on the basis of instructions and data stored in the storage unit.

The storage unit is referred to as "memory", and can store instructions and data received via the interface unit and the like, calculation results of the central processing unit, and the like. Furthermore, the storage unit can store instructions and data (computer programs) constituting specific applications, specifically, an application for determining a spacecraft 10 that executes an imaging operation, an application for determining a small communicator 20 that transmits control data to the spacecraft 10, an application for controlling content of the control data transmitted from the small communicator 20 to the spacecraft 10, an application for controlling transmission and reception of data to and from the small communicator 20, an application for controlling transmission and reception of data to and from the ground station 30, an application for controlling transmission and reception of data to and from the terminal device 500, and the like. The storage unit can include, but is not limited to, a computer-readable medium such as a random access memory (RAM), a read-only memory (ROM), a flash memory, and a hard disk drive (HDD).

In such a hardware configuration, the central processing unit can load the instructions and data (computer programs) constituting the specific applications stored in the storage unit, and execute various kinds of arithmetic processing on the basis of the loaded instructions and data. In addition, data generated by the arithmetic processing can be transmitted to other components via the interface device, and various data can be received from the other components.

Next, specific functions of the server device 40 will be described with reference to FIG. 4.

As illustrated in FIG. 4, the server device 40 can mainly include a communication unit 41, a storage unit 42, an imaging start determination unit 43, a combination determination unit 44, a control data content determination unit 45, and a user interface unit 46.

The communication unit 41 can transmit and receive the above-described various data between the plurality of small communicators 20 (the small communicators 20A to 20C), the ground station 30, and the terminal devices 500 (the terminal devices 500A to 500F). In particular, the communication unit 41 transmits the above-described instruction signal (the command signal) to the specific small communicator 20 on the basis of determination results of the imaging start determination unit 43 and the combination determination unit 44 to be described below, and transmits control data to the specific small communicator 20 on the basis of a determination result of the control data content determination unit 45 to be described below so that the control data is transmitted from the specific small communicator 20 to the specific spacecraft 10.

The storage unit 42 can store various data received by the communication unit 41, data related to determination results of the imaging start determination unit 43, the combination determination unit 44, and the control data content determination unit 45, and the like. Furthermore, the storage unit 42 can store specific applications for the communication unit 41, the imaging start determination unit 43, the combination determination unit 44, and the control data content determination unit 45 to execute predetermined processing (e.g., an application for determining a spacecraft 10 that executes an imaging operation, an application for determining a small communicator 20 that transmits control data to the spacecraft 10, an application for controlling content of the control data transmitted from the small communicator 20 to the spacecraft 10, an application for controlling transmission and reception of data to and from the small communicator 20, an application for controlling transmission and reception of data to and from the ground station 30, an application for controlling transmission and reception of data to and from the terminal device 500, and the like as described above).

The imaging start determination unit 43 can determine a timing at which an imaging operation is started by the spacecraft 10 (the imaging device 300) on the basis of the image capturing request data received from the terminal device 500 or the environment data received from the sensor 25 (or the small communicator 20 to which the sensor 25 is connected).

In a first case as an example, when the imaging start determination unit 43 receives environment data from the sensor 25 or the small communicator 20 to which the sensor 25 is connected on the basis of the detection of the sensor 25, the imaging start determination unit 43 determines whether to execute (start) imaging at a position corresponding to the image-captured position data included in the environment data. For example, in a case where the environment data is wind speed data, precipitation amount data, snowfall amount data, or the like, the imaging start determination unit 43 determines not to execute (start) imaging when the wind speed, the precipitation amount, the snowfall amount, or the like is smaller than a preset threshold, and determines to execute (start) imaging when the wind speed, the precipitation amount, the snowfall amount, or the like is equal to or greater than the preset threshold. That is, in a state where conditions such as thresholds for various environment data have been set in advance, the imaging start determination unit 43 can determine whether to execute (start) imaging at a position (an image-captured position) where the sensor 25 (or the small communicator 20 to which the sensor 25 is connected) that transmits the environment data is installed on the basis of a relationship (comparison) between the actually detected environment data and the conditions. When it is determined to execute (start) imaging, the imaging start determination unit 43 transmits a control signal for starting imaging to the combination determination unit 44 together with the image-captured position data included in the environment data.

On the other hand, in a second case as another example, the imaging start determination unit 43 can determine to start imaging at a time point when a plurality of pieces of image capturing request data for requesting image capturing at the same certain point (or in the same certain region) are received from one or a plurality of terminal devices 500 (e.g., three terminal devices, i.e., the terminal device 500A, the terminal device 500B, and the terminal device 500C in FIG. 1). (At a time point when image capturing request data is received from only one terminal device 500, it may be determined not to start imaging). Here, concerning the imaging operation of the spacecraft 10, it is necessary to limit an operation time to a certain extent in relation to a remaining battery capacity represented by a state of charge (SOC) of the battery 410. Therefore, by setting a timing at which the imaging start determination unit 43 determines to start imaging to a case in which a plurality of pieces of image capturing request data are received, the battery 410 can be controlled not to be insufficiently charged. Here, concerning "a plurality of pieces of image capturing request data", the number of pieces of image capturing request data may be appropriately set. Additionally, in the second case, the imaging start determination unit 43 transmits a control signal for starting imaging to the combination determination unit 44 together with the image-captured position data included in the image capturing request data, similarly to the first case described above.

As described above, the identification data for the small communicator 20 is transmitted to the server device 40 in advance regardless of transmission and reception of the image capturing request data, and the identification data can be stored in the storage unit 42 of the server device 40. Therefore, in the first case described above, the image capturing request data transmitted from the small communicator 20 to the server device 40 may not include image-captured position data.

When receiving the control signal for starting imaging from the imaging start determination unit 43, on the basis of the image-captured position data included in the image capturing request data, the space position data for each of the plurality of spacecrafts 10 received in advance via the ground station 30, and the position data (the identification data) for each of the plurality of small communicators 20, the combination determination unit 44 determines, from among the plurality of spacecrafts 10 and the plurality of small communicators 20, a combination of one spacecraft 10 capable of executing an imaging operation at a point corresponding to the image-captured position data at the fastest speed (within the shortest time) from a time point at which the control signal is received and one small communicator 20 that transmits the above-described control data to the one spacecraft 10 capable of executing the imaging operation. Additionally, in a case where a plurality of spacecrafts 10 cooperatively captures images at the point corresponding to the image-captured position data, the combination determination unit 44 may determine a combination of a plurality of spacecrafts 10 capable of executing the imaging operation and a plurality of small communicators 20 that transmit the above-described control data to the plurality of spacecrafts 10 capable of executing the imaging operation, respectively.

Specifically, the combination determination unit 44 can select a combination in which the total time of "T1+T2+T3" is shortest, with reference to a table obtained by calculating T1, T2, and T3 as illustrated in FIG. 5, T1 being a first time required from the start to the completion of transmission of the control data from the small communicator 20 to the spacecraft 10, beginning from a reference time that is a time point at which the combination determination unit 44 receives the control signal for starting imaging from the imaging start determination unit 43, T2 being a second time required from the completion of the reception of the control data in the spacecraft 10 until the spacecraft 10 completes an imaging operation (until all reflected waves are received), and T3 being a third time required from the completion of the imaging operation until the transmission of the image data (captured image data) from the spacecraft 10 to the ground station 30 is completed. As an example, in a case illustrated in FIG. 5, a combination of "the spacecraft 10B and the small communicator 20B" in which the above-described total time is 90 minutes (the total time of T1:30 minutes, T2:20 minutes, and T3:40 minutes is 90 minutes) is selected. Here, the "reference time", which is a premise for calculating T1, may be a time point at which the combination determination unit 44 receives the control signal for starting imaging from the imaging start determination unit 43 as described above, but is not limited thereto. For example, the "reference time" may be appropriately selected and set, such as X minutes, Y seconds, Z hours, or the like after the time point at which the control signal for starting imaging is received from the imaging start determination unit 43. Additionally, for example, in a case where the image capturing request data transmitted from the terminal device 500 to the server device 400 includes information related to a time at which the spacecraft 10 is required to capture an image, perform an observation, or the like (a desired observation time), the specific value of X, Y, Z, or the like may be determined with reference to the information.

In a case where the spacecraft control system 1 according to the present disclosure is actually used, it is assumed that a large number of pieces of image capturing request data are transmitted from one or a plurality of terminal devices 500 to the server device 400, and as a result, a large number of pieces of control data are transmitted to each spacecraft 10. Therefore, even though the combination determination unit 44 selects a combination of a spacecraft 10 and a small communicator 20 on the basis of only the above-described T1, there is actually a possibility that another imaging operation has already been reserved for the selected spacecraft 10 (or another imaging operation has been executed by the selected spacecraft 10), and the selected spacecraft 10 is not capable of capturing an image according to the command. Therefore, for each of the spacecrafts 10, the combination determination unit 44 may determine the above-described combination in consideration of the above-described T2 and T3 in which information (presence) of control data that has already been transmitted to each of the spacecrafts 10 is also considered. Additionally, concerning the determination of the above-described combination, what are considered by the combination determination unit 44 are not limited to T1, T2, and T3, and others may be further considered. In some cases, only one or two of T1 to T3 may be considered.

Additionally, as in the first case described above, in a case where the environment data is transmitted to the server device 40 from the sensor 25 or the small communicator 20 to which the sensor 25 is connected on the basis of the detection of the sensor 25, and in a case where the imaging start determination unit 43 determines to execute (start) imaging on the basis of the environment data, the combination determination unit 44 may automatically select the small communicator 20 to which the sensor 25 that has transmitted the environment data to the server device 40 is connected as a small communicator 20 to be combined to transmit the control data (that is, in FIG. 1, when the sensor 25B or the small communicator 20B to which the sensor 25B is connected transmits the environment data to the server device 40, the combination determination unit 44 selects the small communicator 20B to which the sensor 25B is connected as a small communicator to be combined). Then, one spacecraft 10 causing the shortest total time described above may be determined with reference to the table as illustrated in FIG. 5.

The combination determination unit 44 transmits the image-captured position data, the data related to the determined combination of at least one spacecraft 10 and at least one small communicator 20, and the data related to the total time (for example, data "the spacecraft 10B and the small communicator 20B" and data "total time of 90 minutes" in the case illustrated in FIG. 5) to the control data content determination unit 45.

On the basis of the data related to the combination of one spacecraft 10 and one small communicator 20 and the data related to the total time received from the combination determination unit 44, the control data content determination unit 45 outputs content of the control data to be transmitted to the small communicator 20 corresponding to the combination (the small communicator 20B in the case illustrated in FIG. 5). The control data content determination unit 45 outputs specific control data on the basis of the image-captured position data and the imaging time data, which indicates a time at which it is required to capture an image (a time at which an imaging operation is started). Here, the imaging time data can be calculated by adding a total time to a time point (time) at which the data related to the combination or the like is received from the combination determination unit 44.

Furthermore, the control data content determination unit 45 can grasp a situation of the image-captured point (or region) on the basis of the image-captured position data and the like, and determine what imaging mode the imaging device 300 of the spacecraft 10 needs to perform the imaging operation in (in a case where the image capturing request data transmitted from the terminal device 500 to the server device 400 includes request information related to an imaging mode, the control data content determination unit 45 can determine the imaging mode on the basis of the request information). On the basis of a determination result, the control data content determination unit 45 can further output the above-described selection data.

The control data content determination unit 45 can transmit, to the communication unit 41, the output control data (the image-captured position data, the imaging time data, and the selection data) together with a request signal for requesting the one spacecraft 10 determined in the combination to transmit the control data. As a result, the communication unit 41 can transmit the control data and the request signal to one small communicator 20 determined in the above-described combination. Additionally, the control data transmitted from the communication unit 41 to the small communicator 20 is specifically "2022-10-14/13:00/33.55 degrees north latitude/135.55 degrees east longitude/MODE1/(FROM 20B TO 10B)" as an example.

The user interface unit 46 can set or change the condition for the imaging start determination unit 43 to determine to start imaging (in the second case described above as an example, the condition for the number of pieces of image capturing request data received in determining to start imaging, for example, whether it is determined to start imaging when three pieces of image capturing request data are received or when five pieces of image capturing request data are received). The user interface unit 46 can also execute erasing, copying, and the like of various data stored in the storage unit 42.

2. Overall Operation of Spacecraft Control System 1

Figure 6:
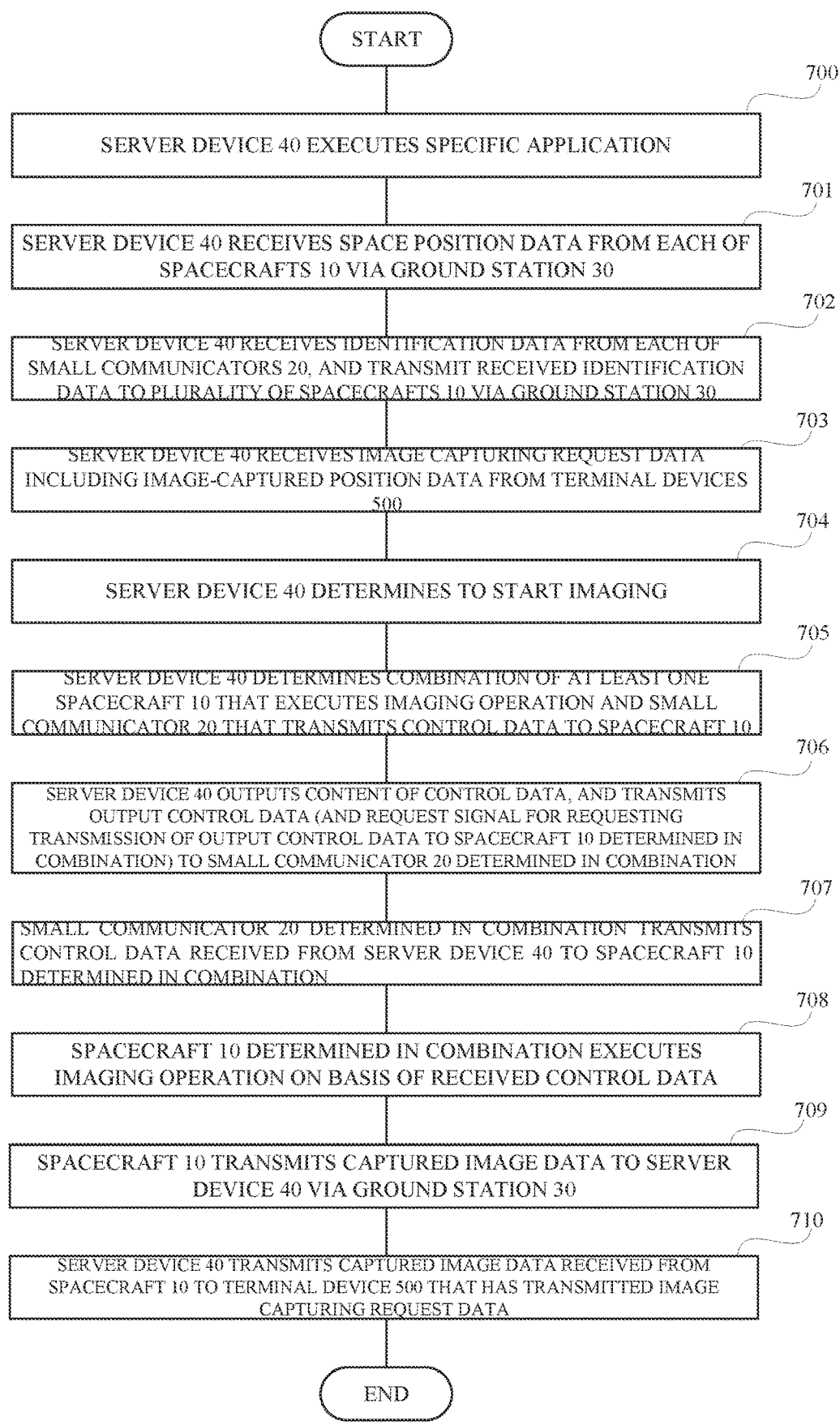
FIG. 6 is a flowchart illustrating an example of an operation performed in the spacecraft control system illustrated in FIG. 1.

Next, an overall operation executed in the spacecraft control system 1 having the above-described configuration will be described with reference to FIG. 6. FIG. 6 is a flowchart illustrating an example of an operation performed in the spacecraft control system 1 illustrated in FIG. 1.

First, in step (hereinafter referred to as "ST") 700, the server device 40 starts and executes the above-described specific application.

Next, in ST701, the server device 40 receives the above-described space position data from each of the plurality of spacecrafts 10 via the ground station 30 (via a communication line).

Next, in ST702, the server device 40 receives the above-described identification data from each of the plurality of small communicators 20 via the communication line. Further, the server device 40 transmits the received identification data for each of the small communicators 20 to the plurality of spacecrafts 10 via the ground station 30 (via the communication lines) (each spacecraft 10 receives the data at the time of identifying each of the plurality of small communicators 20).

Next, in ST703, the server device 40 receives the above-described image capturing request data including image-captured position data from the plurality of terminal devices 500. Additionally, as described above, in a case where the sensor 25 is connected to the small communicator 20, the server device 40 may receive some environment data detected by the sensor 25 from the sensor 25 (or from the small communicator 20 to which the sensor 25 is connected) as an alternative to the image capturing request data (or together with the image capturing request data).

Next, in ST704, (the imaging start determination unit 43 of) the server device 40 determines to start imaging by the method as described above in detail.

Next, in ST705, (the combination determination unit 44 of) the server device 40 determines a combination of at least one spacecraft 10 that executes an imaging operation and a small communicator 20 that transmits control data to the spacecraft 10 by the method as described above in detail.

Next, in ST706, (the control data content determination unit 45 of) the server device 40 outputs content of the control data by the method described as described above in detail. Then, the server device 40 transmits, to the small communicator 20 determined in the above-described combination, the output control data together with a request signal for requesting transmission of the control data to the spacecraft 10 determined in the above-described combination.

Next, in ST707, the small communicator 20 determined in the combination transmits the control data received from the server device 40 to the spacecraft 10 determined in the combination on the basis of the request signal received from the server device 40.

Next, in ST708, the spacecraft 10 determined in the combination executes a predetermined imaging operation on the basis of the control data received from the small communicator 20 as described above in detail.

Next, in ST709, the spacecraft 10 transmits captured image data imaged by the imaging operation executed in ST708 to the server device 40 via the ground station 30 (via the communication line).

Next, in ST710, the server device 40 transmits the captured image data received from the spacecraft 10 in ST709 to the terminal device 500 that has transmitted the image capturing request data to the server device 40 in ST703, and a series of processes end. Thereafter, ST700 to ST710 are repeatedly executed whenever new image capturing request data (and/or environment data) is transmitted to the server device 40.

By executing the operation as described above, the spacecraft control system 1 according to the embodiment can quickly transmit control data to the spacecraft 10, and efficiently transmit captured image data imaged by the spacecraft 10 to the terminal device 500 that transmits image capturing request data. In addition, by basically causing the server device 40 to centrally manage various controls, the spacecraft control system 1 according to the embodiment can efficiently use a communication capacity between the components.

3. Modification of Configuration of Spacecraft Control System

Figure 7:
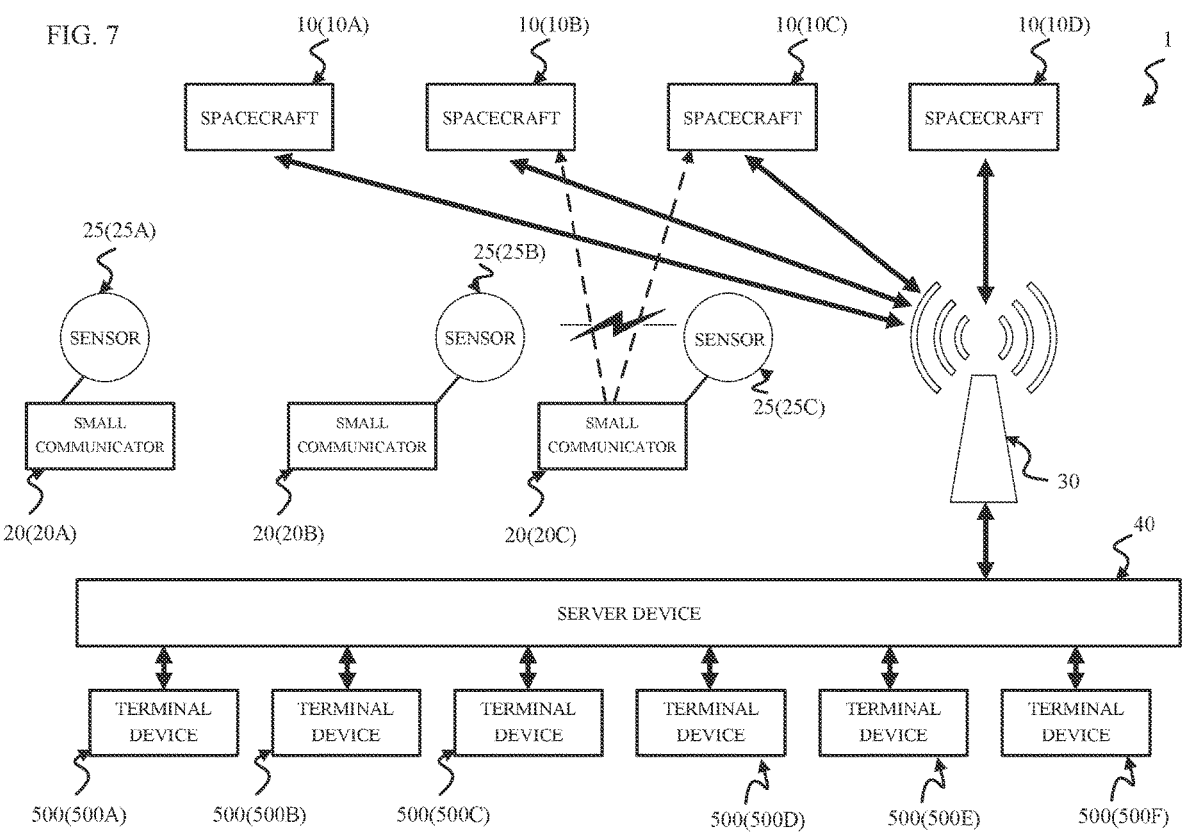
FIG. 7 is a block diagram illustrating an example of a configuration of a spacecraft control system according to a modification.
Figure 8:
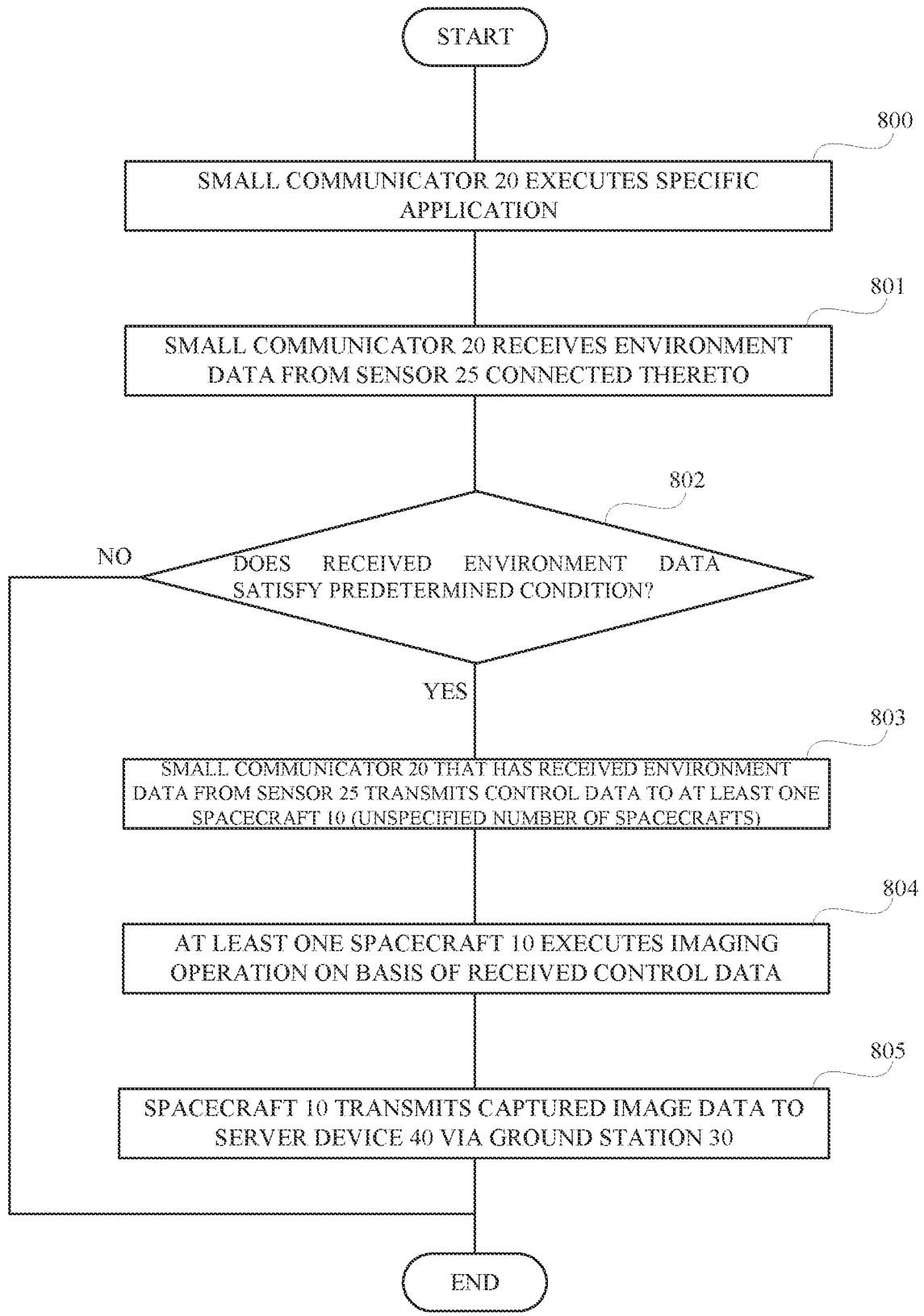
FIG. 8 is a flowchart illustrating an example of an operation performed in the spacecraft control system illustrated in FIG. 7.

Next, an overview of a modification of the configuration of the spacecraft control system 1 will be described with reference to FIGS. 7 and 8. FIG. 7 is a block diagram illustrating an example of a configuration of a spacecraft control system 1 according to a modification. FIG. 8 is a flowchart illustrating an example of an operation performed in the spacecraft control system 1 illustrated in FIG. 7.

Concerning the spacecraft control system 1 according to a modification, components constituting the spacecraft control system 1 are substantially similar to those in the above-described embodiment. The operation mode is slightly different between the above-described embodiment and the modification thereof. Therefore, the detailed description of each component constituting the spacecraft control system 1 according to the modification will be omitted. For the embodiment and the modification thereof, the same spacecraft control system 1 may be shared, or separate spacecraft control systems 1 may be used.

In the spacecraft control system 1 according to the modification, it is assumed that the sensor 25 is connected to the small communicator 20 in a mode similar to that in an "example" described in the embodiment above. Furthermore, it is assumed that various environment data detected by the sensor 25 is transmitted from the sensor 25 to the small communicator 20 to which the sensor 25 is connected. That is, for example, when the sensor 25A detects some environment data, the sensor 25A transmits the environment data to the small communicator 20A. Similarly, when the sensor 25B detects some environment data, the sensor 25B transmits the environment data to the small communicator 20B. Similarly, when the sensor 25C detects some environment data, the sensor 25C transmits the environment data to the small communicator 20C.

Here, in the spacecraft control system 1 according to the modification, as illustrated in FIG. 7, transmission of control data from the small communicator 20 to the spacecraft 10 is not controlled by the server device 40, and when a predetermined condition is satisfied, a predetermined small communicator 20 transmits control data to at least one spacecraft 10 (an unspecified number of spacecrafts). Specifically, the small communicator 20 that has received some environment data from the sensor 25 transmits control data to at least one spacecraft 10 when the received environment data satisfies a predetermined condition. The "predetermined condition being satisfied" means that the detected environment data satisfies a condition such as a preset threshold. For example, in a case where the environment data is "wind speed data", and a threshold for the "wind speed data" is set to "30 m/s" in advance, when the wind speed data as the environment data transmitted from the sensor 25 to the small communicator 20 is "35 m/s", the "predetermined condition is satisfied". Similar thresholds can be set in advance for various environment data.

The spacecraft control system 1 according to the modification will be described with reference to the example illustrated in FIG. 7. When the sensor 25C detects some environment data, the environment data is transmitted to the small communicator 20C. Then, the small communicator 20C compares the environment data received from the sensor 25C with a preset threshold, and determines whether the predetermined condition is satisfied (e.g., whether the received environment data exceeds the preset threshold). When it is determined that the predetermined condition is satisfied, the small communicator 20C can transmit control data to at least two spacecrafts 10 (the spacecrafts 10B and 10C in FIG. 7). In this case, as an example, the control data transmitted from the small communicator 20C to the spacecrafts 10 is "2022-12-15/15:25/30.25 degrees north latitude/ 132.85 degrees east longitude/MODE1/(FROM 20C)". Since the image-captured position data included in the control data indicates a position where the small communicator 20C (and the sensor 25C) is installed, the image-captured position data may be stored in the small communicator 20C in advance. In addition, concerning the selection data included in the control data, it may be determined in advance which mode (between the wide-area imaging mode and the high-resolution imaging mode) an image is to be captured in according to the type of environment data. The imaging time data included in the control data may be a time at which the control data is transmitted from the small communicator 20C to the spacecrafts 10 (in this case, the small communicator 20C has a clock function.).

In the spacecraft control system 1 according to the modification, the small communicator 20 (the small communicator 20C as an example in FIG. 7) can have a hardware configuration similar to that of the server device 40 so as to have a storage function for storing the above-described various settings in addition to the above-described clock function. In addition, the above-described specific application is installed in the hardware.

The spacecraft control system 1 according to the modification can quickly transmit control data from the small communicator 20 to the spacecrafts 10 without having to go through the control process of the server device 40 described in detail in the embodiment, and thus can be effectively used mainly in emergencies such as disasters.

Additionally, in a case where the same spacecraft control system 1 is shared between the embodiment and the modification thereof, information indicating that the control data has been transmitted from the small communicator 20 to the spacecrafts 10 (the small communicator 20C to the spacecrafts 10B and 10C in FIG. 7) may be separately transmitted from the small communicator 20 (the small communicator 20C in FIG. 7) to the server device 40 according to the modification, or the spacecrafts 10 (the spacecrafts 10B and 10C in FIG. 7) that has received the control data may transmit the information indicating that the control data has been transmitted from the small communicator 20 to the spacecrafts 10 (the small communicator 20C to the spacecrafts 10B and 10C in FIG. 7) to the server device 40 via the ground station 30. As a result, the server device 40 can determine the above-described combination according to the embodiment after grasping the information related to the spacecrafts 10 that have already executed the imaging operation according to an aspect of the modification.

Next, an overall operation executed in the spacecraft control system 1 according to the modification described above with reference to FIG. 7 will be described with reference to FIG. 8.

First, in ST800, the small communicator 20 activates and executes the above-described specific application.

Next, in ST801, as described in detail above, the small communicator 20 receives environment data from the sensor 25 connected thereto.

Next, in ST802, as described in detail above, the small communicator 20 determines whether the received environment data satisfies a predetermined condition. Here, when it is determined that the received environment data does not satisfy the predetermined condition, the process ends.

When it is determined in ST802 that the received environment data satisfies the predetermined condition, the process proceeds to ST803. In ST803, the small communicator 20 (the small communicator 20C as an example in FIG. 7) that has received the environment data from the sensor 25 (the sensor 25C as an example in FIG. 7) in ST801 transmits control data to at least one spacecraft 10 (an unspecified number of spacecrafts) (the spacecrafts 10B and 10C as an example in FIG. 7) as described above in detail.

Next, in ST804, at least one spacecraft 10 (the spacecrafts 10B and 10C as an example in FIG. 7) executes an imaging operation on the basis of the control data received from the small communicator 20 in ST803.

Next, in ST805, the spacecraft 10 transmits captured image data to the server device 40 via the ground station 30

(via the communication line), and a series of processes ends. Additionally, the server device 40 that has received the captured image data can transmit the received captured image data to various terminal devices 500 if necessary. Additionally, the terminal device 500 illustrated in FIG. 7 (the terminal device 500 illustrated in FIG. 1 as well in some cases) does not necessarily transmit image capturing request data, and may be any terminal device.

By executing the operation as described above, the spacecraft control system 1 according to the modification can quickly transmit control data to the spacecraft 10 without having to go through the server device 40, and thus is useful particularly in the event of a disaster or the like.

As described above, various embodiments have been exemplified, but the above-described embodiments are merely examples, and are not intended to limit the scope of the invention. The above-described embodiments can be implemented in various other forms, and various omissions, substitutions, and changes can be made without departing from the gist of the invention.

The technology according to the present disclosure can provide a spacecraft control system, a spacecraft control method, and a server device capable of quickly transmitting control data to the spacecrafts 10 by installing a plurality of small communicators 20.

All documents, patent applications, and technical standards described in the present disclosure are incorporated herein by reference in their entirety.

REFERENCE SIGNS LIST

1 Spacecraft control system
10, 10A to 10D Spacecraft
20, 20A to 20C Small communicator
25 Sensor
30 Ground station
40 Server device
110 First reception device
120 Second transmission/reception device
200 Control device
300 Imaging device

The invention claimed is:
1. A spacecraft control system comprising:
a plurality of spacecrafts that image the earth;
a plurality of small communicators that transmit, using a low power wide area (LPWA)-type wireless communication, control data related to imaging operations of the spacecrafts to the spacecrafts; and
at least one ground station that receives, from the spacecrafts, captured image data related to images captured by the spacecrafts and space position data for the spacecrafts, and transmits identification data for the small communicators to the spacecrafts,
wherein each spacecraft of the spacecrafts includes at least a first reception device that receives the control data transmitted from the small communicators using the low power wide area (LPWA)-type wireless communication, a control device that controls an imaging operation of the spacecraft on the basis of the control data received by the first reception device, an imaging device that executes the imaging operation, and a second transmission and reception device that is configured to transmit the image data to the at least one ground station using a wireless communication type that is different than LPWA-type wireless communication.

2. The spacecraft control system according to claim 1, wherein a plurality of operation patterns assumed in relation to the imaging operation of the spacecraft are stored in advance in the control device, and
the control data includes selection data for selecting one of the plurality of operation patterns, image-captured position data related to a position at which an image is captured by the spacecraft, and imaging time data.

3. The spacecraft control system according to claim 1, wherein the transmission and reception device is configured to transmit and receive the captured image data, the space position data, and the identification data to and from the ground station.

4. The spacecraft control system according to claim 1, wherein the identification data includes at least one of position data for the small communicators and ID data for the small communicators.

5. The spacecraft control system according to claim 1, further comprising:
a server device that is connected to the ground station via a communication line to receive the captured image data and the space position data from the ground station, and receives the identification data from the small communicators via a communication line to control transmission of the control data to the spacecrafts from the small communicators.

6. The spacecraft control system according to claim 5, wherein the server device:
receives image capturing request data including the image-captured position data via a communication line; and
determines, among the plurality of spacecrafts and the plurality of small communicators, a combination of at least one spacecraft that executes an imaging operation and at least one small communicator that transmits the control data to the at least one spacecraft that executes the imaging operation, with reference to at least the image-captured position data, the space position data, and the identification data.

7. The spacecraft control system according to claim 6, wherein the combination is determined on the basis of a total time of:
a first time required from a predetermined reference time until the transmission of the control data from the small communicator to the spacecraft is completed;
a second time required from completion of reception of the control data until the spacecraft completes the imaging operation; and
a third time required from completion of the imaging operation until transmission of the captured image data from the spacecraft to the ground station is completed.

8. The spacecraft control system according to claim 5, wherein the server device:
receives, from sensors connected to the small communicators, environment data including the image-captured position data corresponding to positions of the small communicators and the sensors via a communication line;
determines whether to capture an image at each of the positions corresponding to the image-captured position data on the basis of the environment data; and
when it is determined to capture an image at each of the positions corresponding to the image-captured position data, determines, among the plurality of spacecrafts and the plurality of small communicators, a combination of at least one spacecraft that executes an imaging operation and at least one small communicator that transmits the control data to the at least one spacecraft that executes the imaging operation, with reference to at least the image-captured position data, the space position data, and the identification data.

9. The spacecraft control system according to claim 2, wherein the small communicators:
receive, from sensors connected to the small communicators, environment data including the image-captured position data corresponding to positions of the small communicators and the sensors; and
transmit the control data to at least one spacecraft when the environment data satisfies a predetermined condition.

10. The spacecraft control system according to claim 1, wherein the transmission of the control data from the small communicators to the spacecrafts is executed by low power wide area (LPWA)-type wireless communication.

11. A spacecraft control method executed by at least one processor, the spacecraft control method comprising:
receiving image capturing request data including image-captured position data related to a position at which an image is captured by any one of a plurality of spacecrafts via a communication line;
receiving, from each of the plurality of spacecrafts, space position data via at least one ground station;
receiving in advance identification data from each of a plurality of small communicators that transmit control data related to imaging operations to the plurality of spacecrafts via a communication line;
determining a combination of at least one spacecraft that performs an imaging operation to image the earth and at least one small communicator that transmits, using a low power wide area (LPWA)-type wireless communication, the control data to the at least one spacecraft that performs the imaging operation with reference to at least the received image-captured position data, the space position data for each of the plurality of spacecrafts, and the identification data for each of the plurality of small communicators;
transmitting a request signal for requesting the determined at least one small communicator to transmit the control data to the determined at least one spacecraft; and
transmitting image data captured by the determined at least one spacecraft to the at least one ground station using a wireless communication type that is different than LPWA-type wireless communication.

12. The spacecraft control method according to claim 11, wherein the processor includes a central processing unit (CPU), a microprocessor, and/or a graphics processing unit (GPU).

13. A spacecraft control method executed by at least one processor, the spacecraft control method comprising:
receiving environment data including image-captured position data related to a position at which an image is captured by any one of a plurality of spacecrafts from a sensor via a communication line;
receiving, from each of the plurality of spacecrafts, space position data via at least one ground station;
receiving in advance identification data from each of a plurality of small communicators that transmit control data related to imaging operations to the plurality of spacecrafts via a communication line;
determining whether to capture an image at the position corresponding to the image-captured position data on the basis of the received environment data;
determining a combination of at least one spacecraft that performs an imaging operation to image the earth and at least one small communicator that transmits, using a low power wide area (LPWA)-type wireless communication, the control data to the at least one spacecraft that performs the imaging operation with reference to at least the received image-captured position data, the space position data for each of the plurality of spacecrafts, and the identification data for each of the plurality of small communicators;
transmitting a request signal for requesting the determined at least one small communicator to transmit the control data to the determined at least one spacecraft; and
transmitting image data captured by the determined at least one spacecraft to the at least one ground station using a wireless communication type that is different than LPWA-type wireless communication.

14. The spacecraft control method according to claim 13, wherein the processor includes a central processing unit (CPU), a microprocessor, and/or a graphics processing unit (GPU).

* * * * *